United States Patent [19]
Arai et al.

[11] Patent Number: 5,932,886
[45] Date of Patent: Aug. 3, 1999

[54] ULTRAVIOLET IRRADIATION DEVICE

[75] Inventors: Tetsuji Arai, Yokohama; Koutaro Moroishi, Kawasaki, both of Japan

[73] Assignee: Ushiodenki Kabushiki Kaisha, Tokyo, Japan

[21] Appl. No.: 08/822,944

[22] Filed: Mar. 21, 1997

[30] Foreign Application Priority Data

Mar. 27, 1996 [JP] Japan .................................. 8-072170

[51] Int. Cl.$^6$ ....................................................... G01J 1/00
[52] U.S. Cl. ................................... 250/504 R; 250/492.1
[58] Field of Search ........................... 250/493.1, 494.1, 250/504 R, 492.1

[56] References Cited

U.S. PATENT DOCUMENTS

| | | | |
|---|---|---|---|
| 4,048,490 | 9/1977 | Troue | 250/504 R |
| 4,250,390 | 2/1981 | Nickolson | 250/504 R |
| 4,644,899 | 2/1987 | Glaus | 250/504 R |
| 4,877,326 | 10/1989 | Chadwick et al. | 356/394 |
| 4,973,850 | 11/1990 | Tanaka et al. | 250/504 R |
| 5,163,750 | 11/1992 | Natori | 362/310 |
| 5,508,528 | 4/1996 | Mulkens et al. | 250/504 R |
| 5,623,149 | 4/1997 | Kilmer | 250/504 R |
| 5,712,487 | 1/1998 | Adachi et al. | 250/492.1 |
| 5,825,041 | 10/1998 | Belek et al. | 250/504 R |

*Primary Examiner*—Bruce Anderson
*Attorney, Agent, or Firm*—Sixbey, Friedman, Leedom & Ferguson; David S. Safran

[57] ABSTRACT

Treating of a workpiece which frequently undergoes heat-induced changes such as deformation, color changes and the like without using a cooling means for the workpiece is achieved by the fact that, of the light which was incident from a rod-shaped lamp on a trough-shaped cold mirror, the ultraviolet light (including some of the visible rays and infrared light) is reflected by the trough-shaped cold mirror and by at least one other cold mirror which is preferably plate-shaped. Furthermore, of the light which was emitted from the rod-shaped lamp and which was incident on the other cold mirror(s), the ultraviolet light (including some of the visible rays and infrared light) is reflected by the other cold mirror(s). The light reflected by the other cold mirrors is incident on the plate-shaped heat refraction filter and some of the visible rays are reflected and are incident on a workpiece. The light emitted by the rod-shaped lamp is not directly radiated onto the workpiece via the heat refraction filter. Therefore, the IR component and the component of the visible rays which are emitted onto the workpiece can be reduced and overheating of the workpiece can be prevented.

17 Claims, 7 Drawing Sheets

|   | Optical System | Ratio (B/A) |
|---|---|---|
| (1) | Trough-like cold mirror<br><br>+<br><br>Plate-like heat refraction filter | 0.69 |
| (2) | Trough-like cold mirror | 0.47 |
| (3) | Trough-like cold mirror<br><br>+<br><br>Plate-like cold mirror<br><br>+<br><br>Plate-like heat refraction filter | 0.78 |
| (4) | Trough-like cold mirror<br><br>+<br><br>Plate-like cold mirror | 0.60 |

ULTRAVIOLET IRRADIATION DEVICE

BACKGROUND OF THE INVENTION

1. Field of the Invention

The invention relates to an ultraviolet irradiation device which is used for bonding an article to be treated which frequently undergoes changes, such as deformation, heat-induced color changes and the like, using UV radiation, or for curing of ink and the like, the article being a plastic, thermal paper, liquid crystal and the like.

2. Description of Related Art

Conventionally, the following is known as an ultraviolet irradiation device which reduces unnecessary radiation in the visible range or the infrared range and which can carry out curing by suppressing deformations, color changes and the like of the article to be treated:

(1) a combination of a rod-shaped lamp, such as a high pressure mercury lamp, a metal halide lamp or the like, with a cold mirror, (a mirror which has the properties of reflecting ultraviolet light and transmitting or absorbing visible rays and especially infrared light) or (2) a combination of the above described rod-shaped lamp with the cold mirror and a heat refraction filter of the air cooling type or water cooling type (a filter which has the properties of transmitting ultraviolet light, reflecting visible rays and absorbing some of the infrared light).

Figure 6:
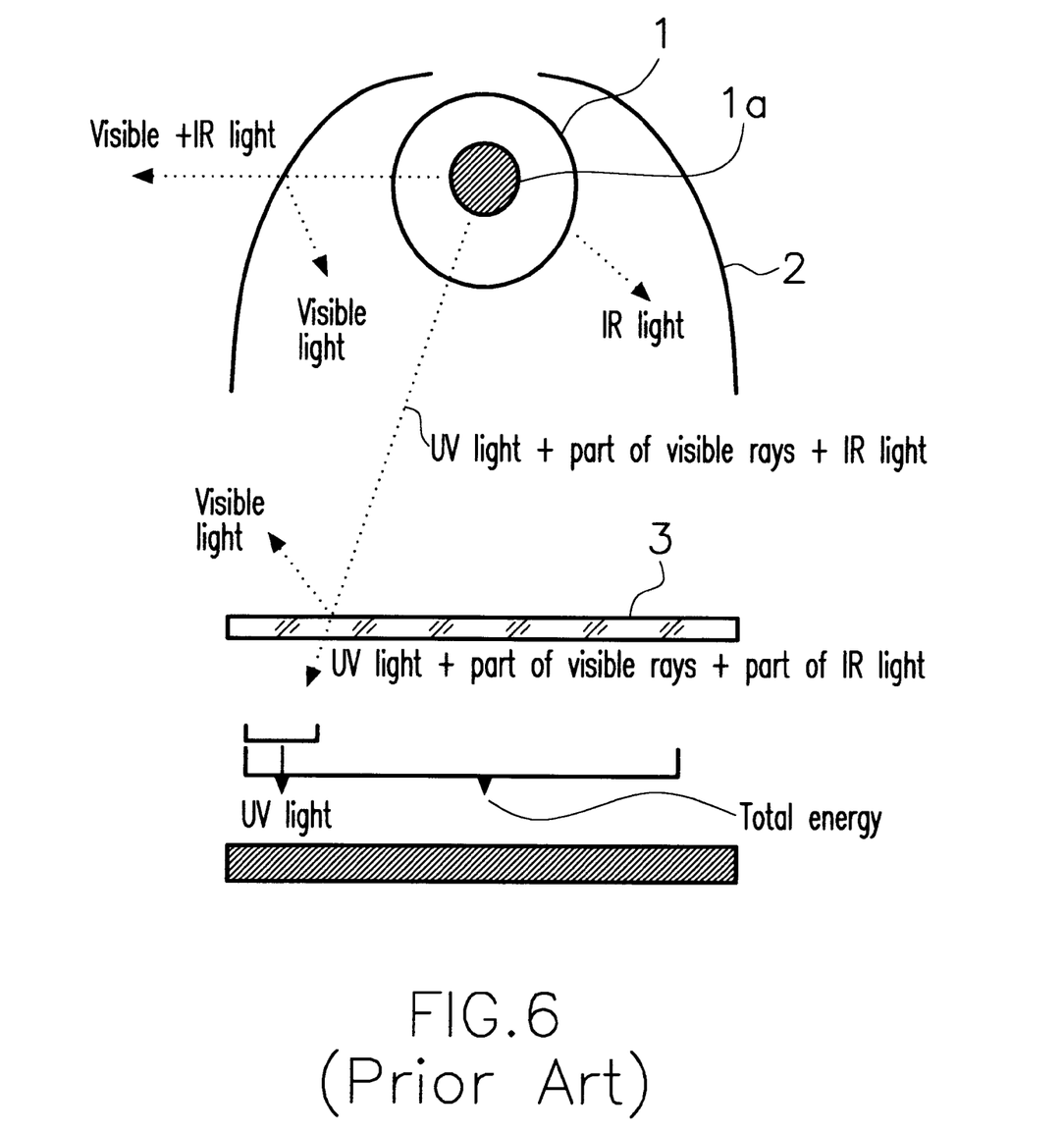
FIG. 6 is a schematic cross section of a conventional ultraviolet irradiation device showing the energy of the light which is emitted therefrom.

FIG. 6 is a schematic illustration of the energy of the light which is emitted by the ultraviolet irradiation device described above in (2), in which the cold mirror 2 is combined with a heat refraction filter 3 of the air cooling type. In the representation, a rod-shaped lamp 1 which, for example, has a tube diameter of 18 mm and an input power per unit length of 240 W/cm. Rod-shaped lamp 1 is subjected to air cooling by a means which is not shown in the drawing. Furthermore, reference number 1a indicates the arc area of the rod-shaped lamp 1. FIG. 6 is a transverse cross-sectional representation in which the rod-shaped lamp 1 has been cut perpendicular to its major (longitudinal) axis.

Furthermore, the cold mirror 2 is trough-like and is arranged parallel to the major axis of rod-shaped lamp 1. Cold mirror 2 is made of a glass or the like which is provided with a vacuum evaporation film which reflects ultraviolet (UV) light and which transmits visible rays and infrared light. A plate-shaped heat refraction filter 3 is made of a glass which transmits ultraviolet light, but which does not transmit infrared light of wavelengths greater than or equal to 3 to 4 microns. Still further, heat refraction filter 3 can also be formed from a glass which is provided with a vacuum evaporation film which transmits ultraviolet light and which reflects visible rays. Reference letter W designates a workpiece which is irradiated with radiant light from an ultraviolet irradiation device which consists of the above described parts and to which ink or the like has been applied.

As is shown in the drawing, some of the light which is emitted from arc area 1a of rod-shaped lamp 1 is incident on cold mirror 2, while the remainder is incident on heat refraction filter 3. Furthermore, infrared light is emitted from the surface of rod-shaped lamp 1 because it has a high temperature, and some of this infrared light is incident on cold mirror 2 and the remainder on heat refraction filter 3.

Of the light incident on cold mirror 2, some of the visible rays and infrared light pass through cold mirror 2, and ultraviolet light (including some of the visible rays and infrared light) is reflected by cold mirror 2 and is incident on heat refraction filter 3. Furthermore, of the light which has been emitted from rod-shaped lamp 1 and which is incident directly on heat refraction filter 3, some of the visible rays are reflected by heat refraction filter 3. As is shown in the drawing, workpiece W is, therefore, irradiated with ultraviolet light, some of the visible rays, and some of the infrared light.

In this case, of the light emitted onto the workpiece W, the light which contributes to setting of the ink or the like applied to the workpiece is ultraviolet light. The visible rays and the infrared light increase the workpiece temperature, but do not contribute to setting of the ink applied to the workpiece or the like. Therefore, it is desirable to use as the ultraviolet irradiation device for treatment of a workpiece which often undergoes changes such as deformation, heat-induced color changes and the like, an ultraviolet irradiation device in which the ratio of the combined infrared light and visible rays to the total energy of irradiation of the workpiece is low and the ratio of ultraviolet light to the total energy of irradiation of the workpiece is high.

In the ultraviolet irradiation device shown in FIG. 6, the effect of reducing infrared radiation is low. Here, in the case of using the above described high pressure mercury lamp with a tube diameter of 18 mm and input power per unit length of 240 W/cm, a ratio B/A is roughly 0.69, where A is the light energy with wavelengths of less than or equal to 250 nm, which is called the energy of all of the light, and B is the light energy with wavelengths from 250 nm to 400 nm, which is called the energy of the ultraviolet light (it is ideal when B/A=1).

Furthermore, in the arrangement shown in FIG. 6, in the case of not using heat refraction filter 3 (in the arrangement described in (1) above) the ratio B/A is roughly 0.47 (in the case of a lamp input power of 240 W/cm).

On the other hand, in the combination of the cold mirror with the heat refraction filter of the water cooling type, among the arrangements described above under (2), the effect of reducing the visible rays is small; also, the ratio B/A is the same as the above described value. Furthermore, it is a disadvantage that additional space for the tube line and water supply means is needed for purposes of water cooling, because a heat refraction filter of the water cooling type is used.

As was described above, in the devices described above in (1) and (2), in any case, the effect of reducing the infrared radiation of less than or equal to 3 to 4 microns is small. Here, for a workpiece which requires a UV dose (integral irradiance of the ultraviolet light) of a stipulated constant minimum amount, a measure such as cooling of the article to be treated, or similar measures, are necessary to prevent overheating.

If, for example, pictures/letters are printed and dried on a thin plastic film with ink which is dried by ultraviolet rays, folds and the like arise in the film when it is overheated. Conventionally, therefore, there was a cooling means, and irradiation with the ultraviolet rays was performed as the film was cooled, when treating a workpiece which is often subject to heat-induced changes, such as deformations, color changes and the like.

Figure 7:
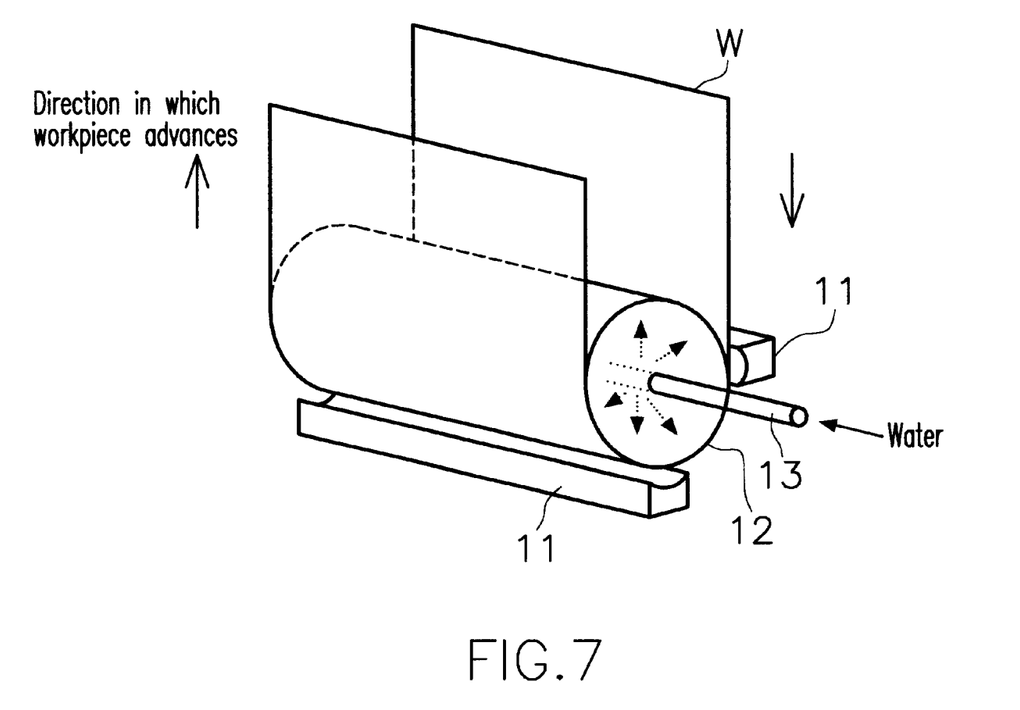
FIG. 7 schematically shows an example of an ultraviolet irradiation device which is provided with a water cooling means.

FIG. 7 is a schematic depiction of an example of the arrangement of an ultraviolet irradiation device in which the above described cooling means is located. In the figure, workpiece W is, for example, a thin plastic film or the like, ultraviolet irradiation devices 11, 11' each have a high pressure mercury lamp, a cold mirror and a heat refraction filter, and a rotary drum 12 is provided which turns axis of rotation 13 when the workpiece W advances in the direction of the arrow in the FIG. 7. Furthermore, rotary drum 12 is tubular and water is introduced into the interior of rotary drum 12 to cool it. By means of the above described arrangement, overheating of the workpiece W by the light emitted from ultraviolet irradiation devices 11, 11' can be prevented.

As was described above, in the conventional ultraviolet irradiation device, it was considered disadvantageous to reduce the infrared radiation of less than or equal to 3 to 4 microns is a small amount. It is, then, necessary to arrange a cooling means and to treat the workpiece as it is cooled, when treating a workpiece which is often subject to heat-induced changes, such as deformations, color changes, and the like.

In the case in which, for example, the cooling means shown in FIG. 7 is provided as the above described cooling means, there is a rotary drum 12 of the water cooling type with a complex arrangement. Here, there must be a water supply pipe and a drain pipe for above described rotary drum 12; this increases system costs and operating costs.

SUMMARY OF THE INVENTION

To eliminate the above described disadvantages of the prior art, it is a primary object of the invention is to provide an ultraviolet irradiation device in which, using a simple optical system, the value (radiation energy of the ultraviolet light)/(radiation energy of all the light) can be effectively increased, and in which a workpiece which is often subject to heat-induced changes, such as deformation, color changes and the like, can be treated without using a cooling means.

In the above described conventional examples, it is conceivable that the ratio of the radiation energy of the ultraviolet light to the radiation energy of all the light has dropped because part of the light emitted from rod-shaped lamp 1 is radiated directly onto workpiece W (in case (1) described above), or because part of the light emitted from rod-shaped lamp (1) is incident directly on the heat refraction filter 3, and because only the light which has passed through heat refraction filter 3 is emitted onto workpiece W (in case (2) described above).

Therefore, if the light emitted from rod-shaped lamp 1 and the light reflected from cold mirror 2 is allowed to strike an additional cold mirror, and if workpiece W is irradiated with the light reflected from this additional cold mirror, or when workpiece W is irradiated via heat refraction filter 3, the value (radiation energy of the ultraviolet light)/(radiation energy of all the light) can be increased.

Furthermore, cooling can be produced with a smaller amount of air than in the case of cooling by blowing air out, in which the rod-shaped lamp 1 is cooled by sucking in air through vent openings, by the measure in which rod-shaped lamp 1 is cooled by blowing in air by blowing the cooling air of rod-shaped lamp 1 through a vent opening which is located in cold mirror 2. Furthermore, in the case of cooling by blowing air in, cooling of the above described additional cold mirror is enabled, by which the temperature increase of this cold mirror can be suppressed.

In addition, a cost reduction is achieved when the cold mirror and the heat refraction filter are plate-shaped.

The above described object is achieved according to the invention based on the above described circumstances by:

(1) the fact that there are a rod-shaped lamp, a first trough-like cold mirror which is located parallel to the direction of the major axis of the rod-shaped lamp and which reflects some of the radiant light from the rod-shaped lamp, and at least one second cold mirror which reflects the other part of the radiant light from the rod-shaped lamp and the reflection light of the first cold mirror, and that the first and second cold mirrors are arranged such that of the light which was emitted from the rod-shaped lamp and which was reflected from the first cold mirror, and of the light which was emitted from the rod-shaped lamp, only the light reflected from the second cold mirror is emitted onto an article to be treated.

(2) furthermore, the fact that there are a rod-shaped lamp, a first trough-like cold mirror which is located parallel to the direction of the major axis of the rod-shaped lamp and which reflects some of the radiant light from the rod-shaped lamp, at least one second cold mirror which reflects the other part of the radiant light from the rod-shaped lamp and the reflection light of the first cold mirror, and a heat refraction filter which transmits the light reflected by the second cold mirror, and that the first and second cold mirrors and the heat refraction filter are arranged such that of the light which was emitted from the rod-shaped lamp and reflected from the first cold mirror, and of the light which was emitted from the rod-shaped lamp, only the light which was reflected by the second cold mirror and which was transmitted by the heat refraction filter is emitted onto the article to be treated.

(3) by the heat refraction filter being plate-shaped in the device described above in the preceding section (2).

(4) the above described second cold mirror being plate-shaped in the devices described above in the preceding sections (1), (2), and (3), respectively.

(5) the fact that, in the devices described above in the preceding sections (1), (2), (3), and (4), respectively, cooling air of the rod-shaped lamp is blown in through at least one vent opening which is located in the above described first cold mirror, that the above described rod-shaped lamp is cooled with high efficiency and that, at the same time, also the above described second cold mirror is cooled.

In accordance with one aspect of the invention, the value of (radiation energy of the ultraviolet light)/(radiation energy of all the light) can be increased by an arrangement as described in the preceding sections (1) through (5) and a workpiece which frequently undergoes heat-induced changes, such as deformations, color changes and the like, can be treated without a cooling means having a complex configuration.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
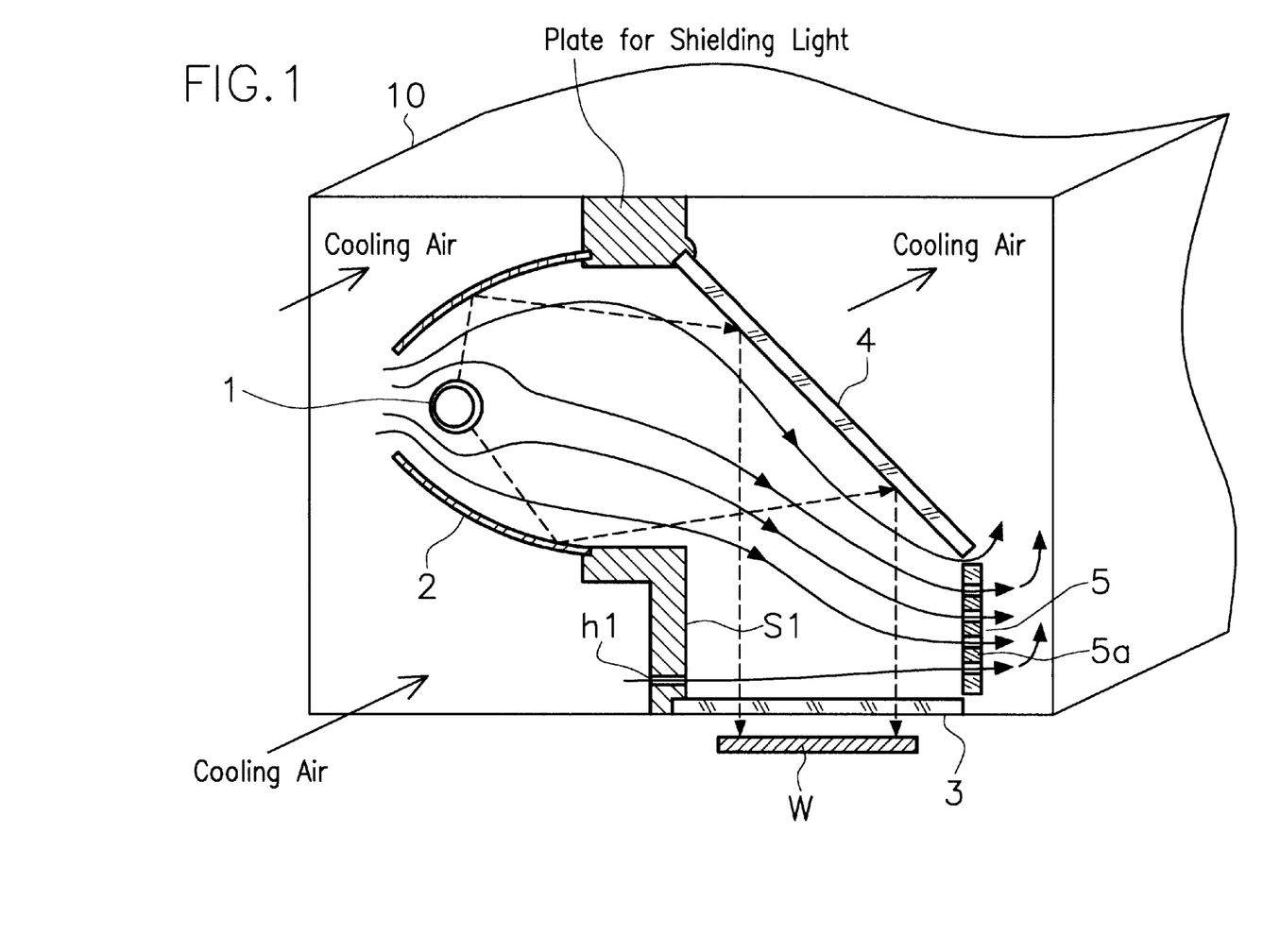
FIG. 1 is a schematic depiction of a first embodiment of the invention.

FIG. 1 schematically shows a first embodiment of the invention using a trough-shaped cold mirror 2, a plate-shaped heat refraction filter 3 and two plate-shaped cold mirrors 4, 5. In the drawing, an ultraviolet irradiation device is shown having a cage-shaped body 10 and within which a rod-shaped lamp 1, such as a high pressure mercury lamp, a metal halide lamp or the like, is provided. In this embodiment, a tubular lamp with a diameter which is less than or equal to 18 mm is used; it is cooled using an input power greater than or equal to 240 W/cm by blowing in air in the direction of the major axis.

The reason for cooling high pressure mercury lamp 1 by blowing air in is that cooling can be produced with less air than in the case of cooling by blowing air out (roughly less than or equal to half). Furthermore, in the case of cooling by blowing air in, it is also possible to cool plate-shaped cold mirrors 4, 5 which are described below. Therefore, heating of the cold mirrors 4, 5 can be suppressed.

Between the trough-shaped cold mirror 2 and the cage-shaped body 10 of the ultraviolet irradiation device, cooling air is supplied which flows as shown by the straight line arrows labeled "Cooling Air" in the drawing. The trough-shaped cold mirror 2 is cooled by the above described cooling air. The rod-shaped lamp 1 is cooled by cooling air which is supplied from the top of trough-shaped cold mirror 2 and which flows in the directions of the curved, solid line arrows shown in the drawing. Furthermore, in plate-shaped cold mirror S there are through openings 5a for cooling air. The cooling air which has cooled rod-shaped lamp 1 is discharged through openings 5a and through a gap between plate-shaped cold mirrors 4, 5 into the space between the rear sides of the plate-shaped cold mirrors 4, 5 and the cage-shaped body 10 of the ultraviolet irradiation device. The air which has cooled the rod-shaped lamp 1 is discharged to the outside together with the cooling air flow represented by the "Cooling Air" arrows.

Additionally, a plate for shielding light S1 is provided with through opening h1 for cooling air. Heat refraction filter 3 is cooled by cooling air which flows through opening h1 so as to be kept at less than or equal to 200° C.

Figure 2:
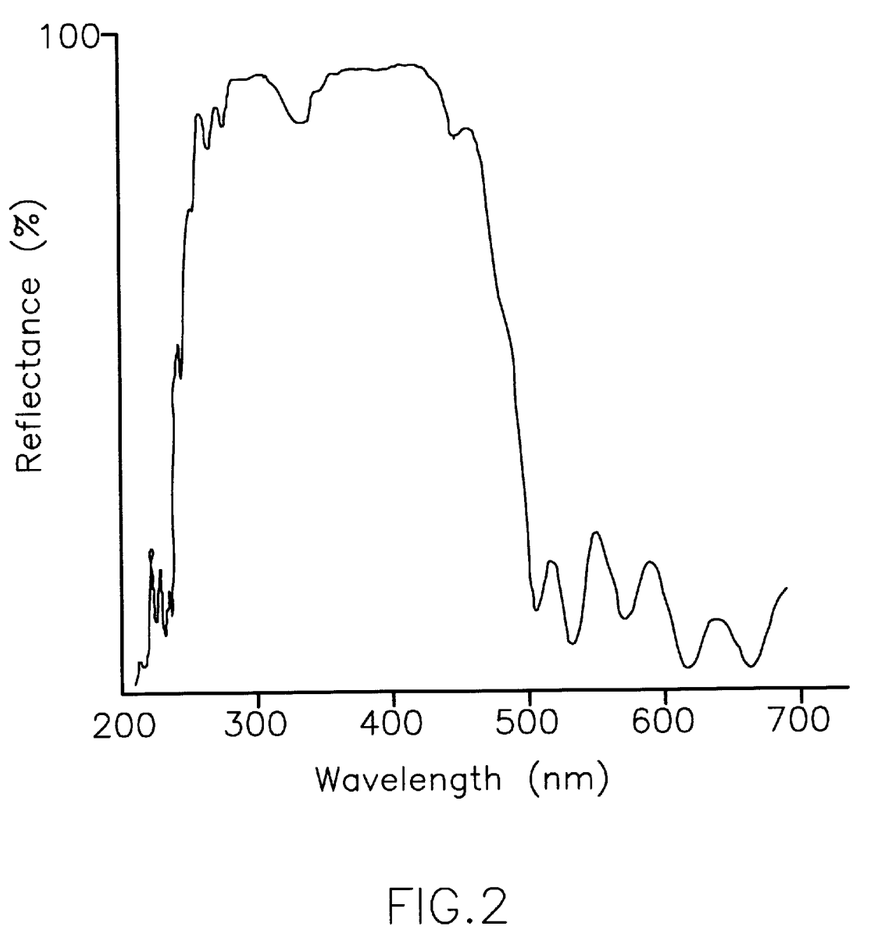
FIG. 2 is a graph showing an example of the spectral reflectance of the trough-like cold mirror.

FIG. 2 is a graphic representation of one example of the spectral reflectance of trough-shaped cold mirror 2. Trough-shaped cold mirror 2 reflects ultraviolet light with wavelengths of roughly 200 nm to 500 nm and transmits visible rays and infrared light, as is shown in the drawing. Furthermore, plate-shaped cold mirrors 4, 5 have the same spectral reflectance properties as trough-shaped cold mirror 2.

Figure 3:
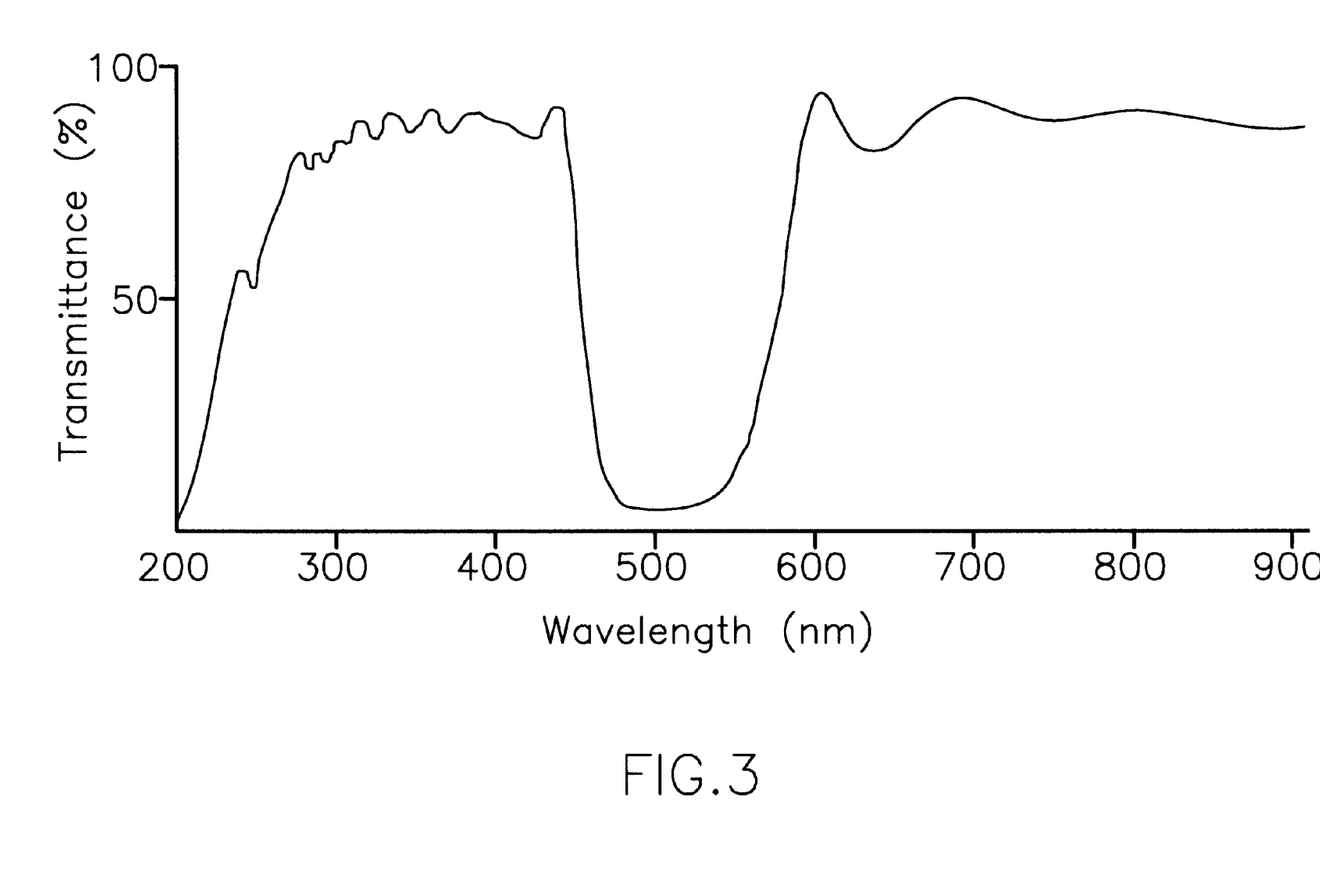
FIG. 3 is a graph showing an example of the spectral transmittance of the plate-shaped heat refraction filter.

FIG. 3 is a graphic representation of one example of the spectral transmittance of plate-shaped heat refraction filter 3. As shown, filter 3 transmits ultraviolet light with wavelengths of roughly 200 nm to 450 nm, but reflects visible rays with roughly 450 nm to 600 nm.

In FIG. 1, some of the light emitted from rod-shaped lamp 1 is incident on trough-shaped cold mirror 2, while the remainder thereof is incident on plate-shaped cold mirrors 4, 5. Of the light which is incident on trough-shaped cold mirror 2, some of the visible rays and the infrared light passes through trough-shaped cold mirror 2 as was described above, and the ultraviolet light (including part of the visible rays and of the infrared light) is reflected from trough-shaped cold mirror 2 and is incident on plate-shaped cold mirrors 4, 5. The light reflected thereby is furthermore incident on heat refraction filter 3, by which some of the visible rays are reflected and the remaining light is incident on workpiece W.

On the other hand, of the light which was emitted from rod-shaped lamp 1 and which was incident directly on cold mirrors 4, 5, some of the visible rays and the infrared light passes through cold mirrors 4, 5, and the ultraviolet light (including part of the visible rays and infrared light) is reflected by plate-shaped cold mirrors 4, 5. The UV light reflected by plate-shaped cold mirrors 4, 5 (including part of the visible rays and infrared light) is furthermore incident on heat refraction filter 3 from which some of the visible rays are reflected and the remaining light is incident on workpiece W.

Trough-shaped cold mirror 2 and plate-shaped cold mirrors 4, 5, for example, have the spectral reflectance shown in FIG. 2. Furthermore, heat refraction filter 3, for example, has the spectral transmittance shown in FIG. 3.

The above described arrangement can, therefore, greatly reduce the IR light component and the component of the visible rays of the light which irradiates workpiece W. This means that, in this embodiment, the IR light component and the component of the visible rays of the light which irradiates workpiece W can be reduced, and the above-described ratio B/A can be increased, because the light emitted by rod-shaped lamp 1 is not emitted directly through heat refraction filter 3 onto workpiece W. Furthermore, by making the heat refraction filter 3 and cold mirrors 4, 5 plate-shaped, each of them can be produced at low cost.

Figure 4:
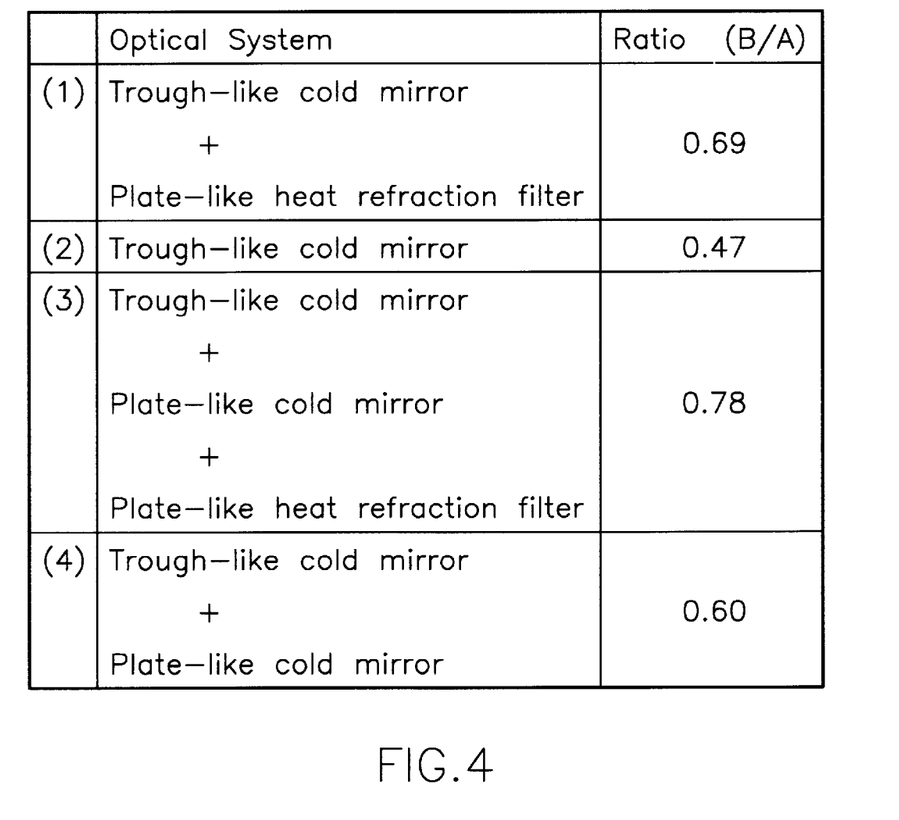
FIG. 4 is a comparison chart showing relative values of the irradiation energy under specified irradiation conditions.

FIG. 4 is a chart showing the above described ratio B/A in each of the following cases:

(1) In the case of using the trough-shaped cold mirror and plate-shaped heat refraction filter for the conventional ultraviolet irradiation device shown in FIG. 6;

(2) In the case of using only the trough-shaped mirror in FIG. 6.

(3) In the case of using the trough-shaped cold mirror, the plate-shaped cold mirrors, and the plate-shaped heat refraction filter as described above.

(4) In the case of using only the trough-shaped cold mirror and the plate-shaped cold mirrors in FIG. 1.

For the cases shown in the FIG. 4, the input power per unit length of the lamp is 240 W/cm. Ratio B/A was determined using the total energy of the light with a wavelength from 250 nm to infinity as A and using the light energy with a wavelength from 250 nm to 400 nm as B. As is illustrated in the figure, ratio B/A in above described case (1) is 0.69 and in above described case (2) is 0.47. On the other hand, ratio B/A for this embodiment in case (3) is 0.78 and in case (4) is 0.60. This means that, in this embodiment (in case (3) described above) ratio B/A can be increased by roughly 13% as compared to the conventional case of using the trough-shaped cold mirror and plate-shaped heat refraction filter (in case (1) described above). Furthermore, in this embodiment, in the case of using only the trough-shaped cold mirror and the plate-shaped cold mirror (in case (4) described above) the ratio B/A as compared to the conventional case of using the trough-shaped cold mirror (in case (2) described above) could be increased by roughly 28%.

As was described above, ratio B/A in this embodiment has been increased compared to the conventional example in which the lamp input power is the same as in this embodiment. In this way, the emission of visible rays and especially of the light in the infrared range can be reduced. Therefore, it becomes possible to treat a workpiece which is frequently subject to heat-induced changes, such as deformation, color changes and the like, without using a cooling means for the workpiece.

Furthermore, by cooling by blowing air in, cooling of the lamp was enabled with high efficiency, by which multiplication of the lamp input power was enabled. In this way, an adverse thermal effect is not exerted on a workpiece with relatively good thermal stability even when, according to the achieved reduction of emission of visible rays and of the infrared light, the lamp input power is increased. Therefore, it becomes possible to emit ultraviolet rays with a greater intensity and to shorten the treatment time.

Figure 5:
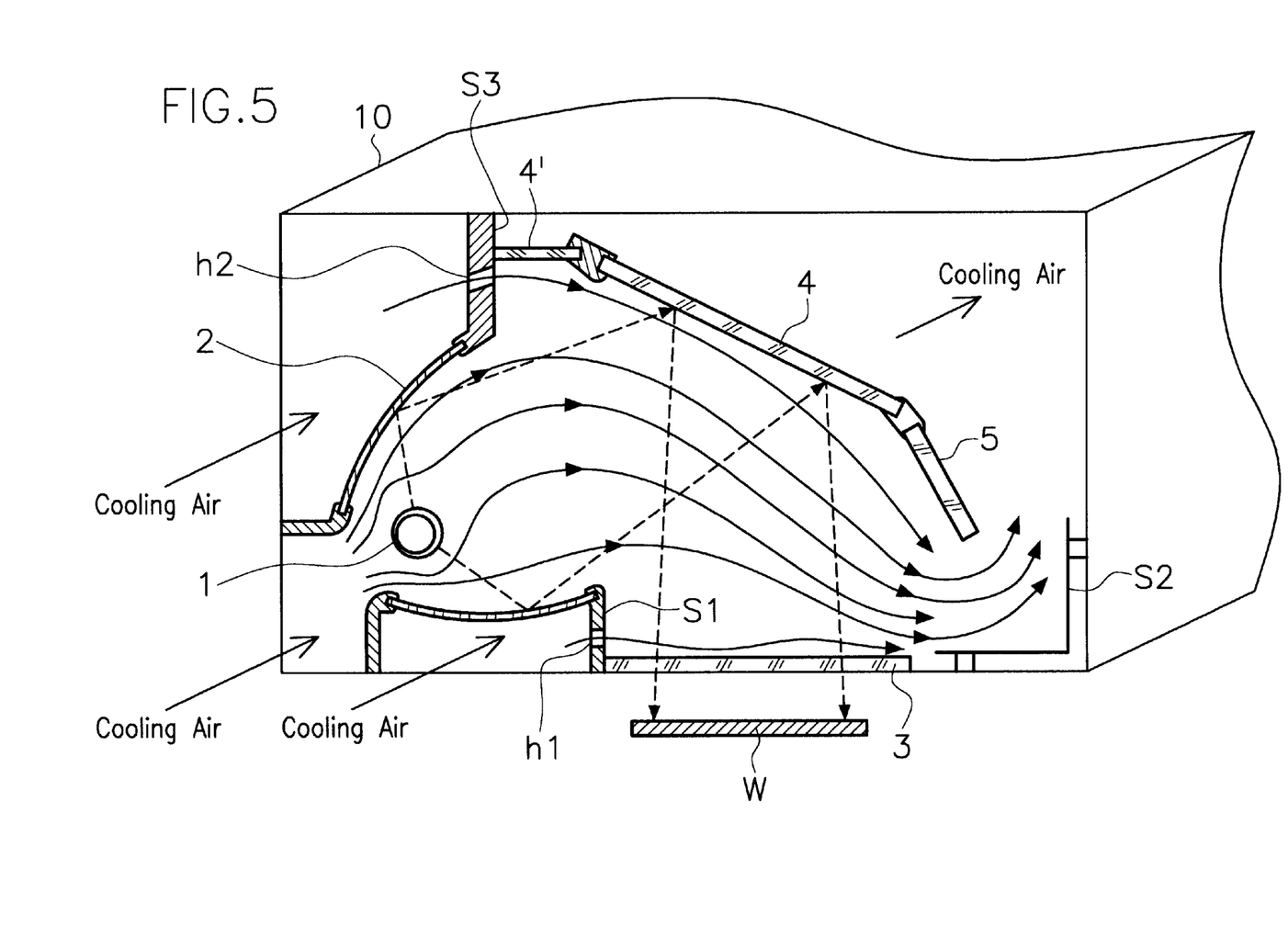
FIG. 5 shows a schematic depiction of a second embodiment of the invention.

FIG. 5 is a schematic of a second embodiment of the invention in which an example is shown using three plate-shaped cold mirrors. In the FIG. 5, the same parts as in FIG. 1 are provided with the same reference numbers.

In this embodiment, there is an additional plate-shaped cold mirror 4', and the bottom area of plate-shaped cold mirror 5 is open with a plate for shielding light S2 being provided in this area. Furthermore, an open part of trough-shaped mirror 2 is pointed slightly upward. Also, as in FIG. 1, between trough-shaped cold mirror 2 and cage-shaped body 10 of the ultraviolet irradiation device, cooling air is supplied which flows in the direction of the solid arrows labeled "Cooling Air" in the drawing, and the trough-shaped cold mirror 2 is cooled by this cooling air. Rod-shaped lamp 1 is cooled by cooling air which is supplied from the top part of trough-shaped cold mirror 2 and which flows in the directions of the curved solid line arrows.

The cooling air which has cooled rod-shaped lamp 1 is discharged, from an opening in the bottom area of the plate-shaped cold mirror 5, into the space between the rear sides of plate-shaped cold mirrors 4, 5 and cage-shaped body 10 of the ultraviolet irradiation device. Furthermore, the air which has cooled the rod-shaped lamp 1 is discharged to the outside together with the cooling air flow represented by the "Cooling Air" arrows.

A plate for shielding light S1 is provided with a through opening h1 for cooling air. Heat refraction filter 3 is cooled by cooling air which flows through the through opening h1 for cooling air. Furthermore, a plate for shielding light S3 is provided with a cooling air opening h2 extending through it. Plate-shaped cold mirror 4' is cooled by cooling air which flows through the through cooling air opening h2.

In FIG. 5, part of the light emitted by rod-shaped lamp 1 is incident on trough-shaped cold mirror 2 while the other part thereof is incident on plate-shaped cooling mirrors 4', 4 and 5. As was described above, of the light which was incident on trough-shaped mirror 2, the ultraviolet light (including part of the visible rays and infrared light) is reflected from trough-shaped cold mirror 2 and is incident on the plate-shaped cold mirrors 4', 4, and 5. The light reflected thereby is, also, incident on heat refraction filter 3, from which some of the visible rays are reflected, and the remaining light is incident on workpiece W.

On the other hand, of the light which was emitted from rod-shaped lamp 1 and which was incident directly on cold mirrors 4', 4 and 5, the ultraviolet light (including part of the visible rays and of the infrared light) is reflected by plate-shaped cold mirrors 4', 4, 5. The light reflected thereby is also incident on heat refraction filter 3, from which some of the visible rays are reflected and the remaining light is incident on workpiece W.

Trough-shaped cold mirror 2 and plate-shaped cold mirrors 4', 4, 5 have the spectral reflectance shown above in FIG. 2. Furthermore, heat refraction filter 3, for example, has the spectral transmittance shown in FIG. 3. The above described arrangement can therefore set the ratio B/A to the values shown in FIG. 4, as in the above described first embodiment. This enables the treatment of a workpiece which frequently undergoes heat-induced changes, such as deformations, color changes and the like, without using a cooling means for the workpiece.

In the above described embodiment, a case of using two or three plate-shaped cold mirrors is described. This version can, however, also be attained using at least four plate-shaped cold mirrors. Furthermore, the process for cooling of rod-shaped lamp 1, trough-shaped cold mirror 2, heat refraction filter 3 and plate-shaped cold mirrors 4, 4' and 5 is not limited to the above described embodiment. Other cooling processes can also be used.

ACTION OF THE INVENTION

As was described above, according to the invention, the value of the ratio (radiation energy of the ultraviolet light)/(radiation energy of all the light) can be increased by the measure by which the light reflected from the rod-shaped lamp and the light reflected from the trough-shaped cold mirror are allowed to strike an additional cold mirror, and by which the workpiece is irradiated with the light reflected by this cold mirror, or by which the workpiece is irradiated via the heat refraction filter. Therefore, the irradiation of the workpiece with visible rays and especially of the light in the infrared range is reduced. This enables treatment of a workpiece which frequently undergoes heat-induced changes. such as deformations, color changes and the like, without using a cooling means for it.

Cooling can be done with a smaller amount of air as compared to the case of cooling by blowing air out, in which the rod-shaped lamp is cooled by sucking in air through vent openings, by the measure in which the rod-shaped lamp is cooled by blowing air in by blowing in the cooling air of the rod-shaped lamp through a vent opening which is located in the trough-shaped cold mirror.

Furthermore, in the case of cooling by blowing air in, cooling of the above described additional mirror is likewise enabled, by which heating of this cold mirror can be prevented.

In addition, a cost reduction is achieved when the cold mirror and the heat refraction filter are made plate-shaped.

Still further, by cooling by blowing air in, high efficiency cooling is enabled by which a multiplication of the lamp input power is enabled. In this way, an adverse thermal effect is not exerted on a workpiece with relatively good thermal stability if the lamp input power is increased along with reduction of visible rays and infrared light achieved. This enables the ultraviolet rays to be emitted with greater intensity and the treatment time to be shortened.

It is to be understood that although preferred embodiments of the invention have been described, various other embodiments and variations may occur to those skilled in the art. Any such other embodiments and variations which fall within the scope and spirit of the present invention are intended to be covered by the following claims.

What we claim is:

1. Ultraviolet irradiation device comprising a rod-shaped lamp, a trough-shaped first cold mirror which is located parallel to a major axis of the rod-shaped lamp for reflecting part of radiant light emitted from the rod shaped lamp, and at least one second cold mirror for reflecting another part of the radiant light from the rod-shaped lamp which is directly incident thereon and light reflected by the first cold mirror; wherein the first and second cold mirrors are arranged relative to each other such that only light reflected by the at least one second cold mirror is emitted, without further reflection by additional mirrors, from the device onto an article to be treated.

2. Ultraviolet irradiation device according to claim 1, further comprising a heat refraction filter which transmits light reflected by the at least one second cold mirror, and wherein the first and second cold mirrors and the heat refraction filter are arranged such that, of the light emitted from the rod-shaped lamp, only light which is reflected by the at least one second cold mirror and which is transmitted by the heat refraction filter is emitted from the device onto the article to be treated.

3. Ultraviolet irradiation device according to claim 2, wherein the heat refraction filter is plate-shaped.

4. Ultraviolet irradiation device according to claim 3, wherein the second at least one cold mirror is plate-shaped.

5. Ultraviolet irradiation device according to claim 4, wherein at least one vent opening is provided in the first cold mirror through which cooling air is blown in for high efficiency cooling of the rod-shaped lamp and for also cooling the second cold mirror.

6. Ultraviolet irradiation device according to claim 4, wherein said at least one second cold mirror comprises three plate-shaped cold mirrors.

7. Ultraviolet irradiation device according to claim 2, wherein the second at least one cold mirror is plate-shaped.

8. Ultraviolet irradiation device according to claim 7, wherein said at least one second cold mirror comprises three plate-shaped cold mirrors.

9. Ultraviolet irradiation device according to claim 2, wherein at least one vent opening is provided in the first cold mirror through which cooling air is blown in for high efficiency cooling of the rod-shaped lamp and for also cooling the second at least one cold mirror.

10. Ultraviolet irradiation device according to claim 2, wherein at least one vent opening is provided in the first cold mirror through which cooling air is blown in for high efficiency cooling of the rod-shaped lamp and for also cooling the at least one second cold mirror, an outlet for the cooling air being provided provided between the at least one second cold mirror and the heat refraction filter.

11. Ultraviolet irradiation device according to claim 1, wherein the second at least one cold mirror is plate-shaped.

12. Ultraviolet irradiation device according to claim 9, wherein said at least one second cold mirror comprises three plate-shaped cold mirrors.

13. Ultraviolet irradiation device according to claim 1, wherein at least one vent opening is provided in the first cold mirror through which cooling air is blown in for high efficiency cooling of the rod-shaped lamp and for also cooling the second at least one cold mirror.

14. Ultraviolet irradiation device according to claim 1, wherein the at least one second cold mirror comprises a plurality of plate-shaped cold mirrors; wherein at least one vent opening is provided in the first cold mirror through which cooling air is blown in for high efficiency cooling of the rod-shaped lamp and for also cooling the second cold mirrors, openings being provided in one of the second cold mirrors as outlets for the cooling air.

15. Ultraviolet irradiation device according to claim 1, wherein the at least second mirror comprises a pair of adjacent plate-shaped mirrors positioned at an angle with respect to each other.

16. Ultraviolet irradiation device according to claim 15, wherein an edge of one of said adjacent plate-shaped mirrors is located in proximity to an outlet through which light is emitted from the device.

17. Ultraviolet irradiation device according to claim 15, wherein said mirrors reflect light of wavelengths of about 200 nm to 500 nm and transmit visible and infrared light.

* * * * *